Dec. 11, 1951     R. L. CRAVEN     2,578,338
PARAFORMALDEHYDE PRODUCTION WITH
COUNTERCURRENT CONCENTRATION
Filed April 21, 1949
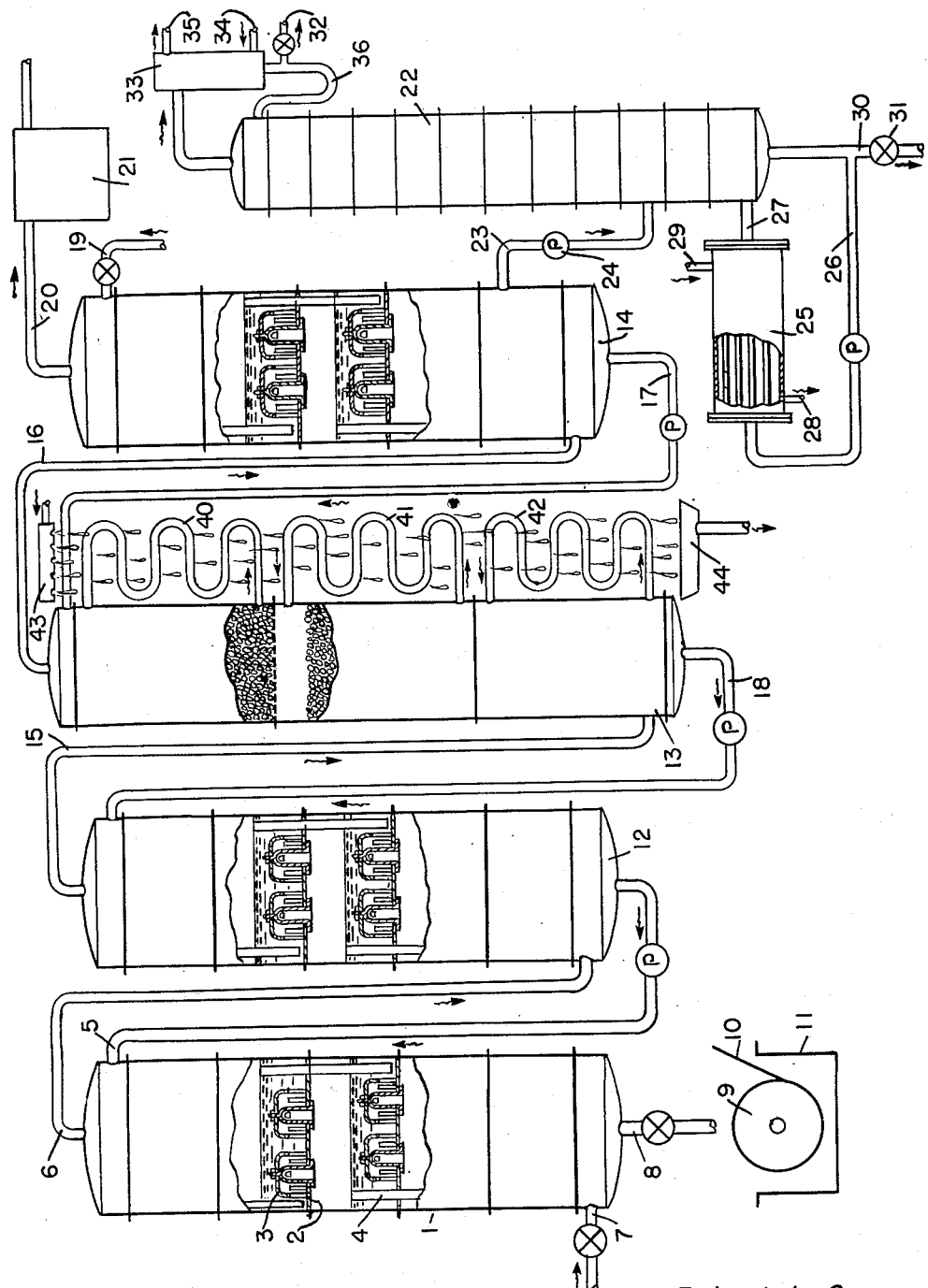
Robert L. Craven
INVENTOR
BY
ATTORNEY Patented Dec. 11, 1951

2,578,338

UNITED STATES PATENT OFFICE 2,578,338

PARAFORMALDEHYDE PRODUCTION WITH COUNTERCURRENT CONCENTRATION

Robert L. Craven, Westfield, N. J., assignor to E. I. du Pont de Nemours and Company, Wilmington, Del., a corporation of Delaware Application April 21, 1949, Serial No. 88,791

4 Claims. (Cl. 260—340)

This invention relates to the production of paraformaldehyde, and more particularly it relates to the direct production of paraformaldehyde from water and gases obtained in the conversion of methanol to formaldehyde.

Formaldehyde-containing gases have long been produced in large amounts by the catalytic oxidation of methanol. Such gases contain from 3% to 20% formaldehyde, 2% to 27% water vapor, 42% to 80% $N_2$, 1% to 25% $O_2$, and 0% to 14% of other gases including methanol, hydrogen, carbon dioxide, and carbon monoxide. These formaldehyde-containing, methanol oxidation gases, hereinafter referred to as methanol conversion gases, are conventionally absorbed in water for the production of 30% to 50% aqueous solutions of formaldehyde.

Paraformaldehyde is most generally produced by the vacuum evaporation of aqueous solutions of formaldehyde. It has also been suggested heretofore to produce paraformaldehyde by fractional distillation of aqueous formaldehyde solutions or by direct condensation of methanol conversion gases.

It is an object of this invention to produce paraformaldehyde in a single continuous operation by utilizing the sensible heat of hot methanol conversion gases passing in countercurrent contact with water or aqueous solutions of formaldehyde.

It is another object of this invention to produce paraformaldehyde in a single continuous operation from methanol conversion gases and water.

It is still another object of this invention to produce paraformaldehyde in a single continuous operation from methanol conversion gases and water, utilizing the sensible heat in such gases to remove the water from the paraformaldehyde.

It is still a further object of this invention to produce paraformaldehyde in a single continuous operation from methanol conversion gases and water, and preventing a build-up of methanol in the process.

Other objects of the invention will appear hereinafter.

The objects of this invention may be accomplished, in general, by passing methanol conversion gases directly from the converter apparatus and while they have a temperature of between 200° C. and 300° C. in succession through a series of progressively less concentrated fractions of aqueous solutions of formaldehyde in a plate column, said aqueous solutions of formaldehyde flowing from plate to plate in said column in a direction opposite to the flow of the gases whereby the fractions become progressively more concentrated in formaldehyde, said fractions being sufficient in number to concentrate the formaldehyde to liquid paraformaldehyde (93% to 96% formaldehyde), removing the gases from one end of the column, and removing the liquid paraformaldehyde from the other end thereof.

Although the process of this invention may be operated by starting with an aqueous formaldehyde fraction having any desired concentration of formaldehyde, it is preferred to operate the process by starting with water in order to remove substantially all (at least 98%) of the formaldehyde content from the gases. In this way, the sole source of the formaldehyde in the paraformaldehyde produced in the process is the formaldehyde content of the methanol conversion gases. By starting with water in sufficient amount to remove at least 98% of the formaldehyde content of the gases and gradually absorbing and concentrating formaldehyde in the water until a paraformaldehyde concentration is reached, it is necessary to supplement the process with means for removal of excess water and methanol. Because it is necessary to cool the gases to insure complete absorption of the formaldehyde, the gases are then insufficient to remove all of the water from the system. Moreover, the methanol content of the gases will build up in the system to the point where it will seriously interfere with the production of paraformaldehyde.

The process of the present invention will be more clearly understood by reference to the following detailed description taken in connection with the accompanying drawing, in which the figure shows, in diagrammatic side elevational view, a preferred embodiment of apparatus suitable for use in carrying out the process.

Referring to the drawing, reference numeral 1 designates a conventional fractionating column containing a number of plates 2 equipped with bubble caps 3 and riser pipes 4. Column 1 is also provided with an inlet pipe 5 for the incoming aqueous solution of formaldehyde and an outlet pipe 8 for withdrawing the liquid paraformaldehyde, and inlet and outlet pipes 7 and 6, respectively, for passage of the hot methanol conversion gases through the column. The liquid paraformaldehyde passing from outlet pipe 8 may be flowed onto a rotating evaporation drum 9, provided with scraper 10 by means of which solid paraformaldehyde may be obtained in receiver 11.

In accordance with the preferred embodiment of the invention, column 1 is connected in series to absorption towers 12, 13, and 14, pipes 6, 15, and 16 carrying the gases serially from column 1 to tower 12, from tower 12 to tower 13, and from tower 13 to tower 14, respectively. Column 1 is also connected serially to towers 12, 13, and 14 for passage of aqueous formaldehyde solutions in succession through towers 14, 13, and 12 to column 1. Pipes 17, 18, and 5 carry the aqueous solutions of formaldehyde serially from tower 14 to tower 13, from tower 13 to tower 12, and from tower 12 to column 1, respectively. Pipes 5, 17, and 18 are each provided with a pump to lift the solution from the bottom of the respective towers to the top of the next succeeding tower and the column.

Water may be passed into the top of tower 14 through pipe 19 provided with a valve for regulation of the flow. The top of tower 14 is provided with an exhaust pipe 20 for the gases from which the formaldehyde has been removed. An exhaust fan 21 may be connected to pipe 20, such exhaust fan preferably having sufficient suction to draw the gases through the column 1 and towers 12, 13, and 14.

Tower 14 is connected to pressure still 22 by means of pipe 23 and pump 24. Pressure still 22 is provided with steam calandria 25 which is connected to the still by means of pipes 26 and 27, pipe 26 having a pump positioned thereon for circulation of liquid through the calandria. The liquid circulated through the calandria is heated by passing steam through inlet and outlet pipes 29 and 28, respectively. Substantially formaldehyde-free water is discarded through pipe 30 controlled by valve 31. Concentrated aqueous solution of formaldehyde containing a considerable proportion of methanol is condensed in condenser 33, cooled by water flowing through inlet and outlet pipes 34 and 35. A portion of the concentrated formaldehyde solution is refluxed through pipe 36 and a portion is withdrawn through pipe 32 as by-product of the process.

The absorption apparatus as illustrated comprises three different types of absorption towers. Tower 12 is a bubble-cap tower in which the gas flows countercurrent to the aqueous formaldehyde. Tower 13 is a conventional three-section packed tower equipped with a spill-type cooler for each section. The respective coolers 40, 41, and 42 are continuously cooled by dripping or spraying of cold water from the perforated pipe 43 and which is caught by catch basin 44. Tower 14 is a bubble-cap type of absorption tower. The absorption towers may, of course, be of other conventional types, and they may be the same or different, and there may be any desired number of towers.

Fractionating column 1 may be operated to produce paraformaldehyde by passing an aqueous solution of formaldehyde containing 20% to 50% formaldehyde through pipe 5 into the top of the column, passing freshly produced methanol conversion gases having a temperature of 200° C. to 300° C. through pipe 7 into the bottom of the column; the gases passing from the top of the column through pipe 6, and the liquid paraformaldehyde passing out through pipe 8. The flow of the gases may be regulated by the valve in pipe 7, and the flow of the liquid may be regulated by means of the pump in pipe 5 and the valve in pipe 8. The number of plates in the column necessary to concentrate the formaldehyde solution to paraformaldehyde is dependent, of course, upon the concentration of formaldehyde in the solution passing into the column and the rapidity of flow of the liquid and gas.

The process utilizing only column 1 of the illustrated apparatus, although suitable for the production of paraformaldehyde, necessitates the use of a 20% to 50% formaldehyde solution from outside source, and it requires the further recovery of formaldehyde from the gases exhausted from the column. It is accordingly preferred to supplement fractionating column 1 with absorption apparatus above described to simultaneously absorb nearly all, at least 98%, of the formaldehyde from the gas by passing it through water, and produce progressively stronger aqueous solutions of formaldehyde up to a strength of 20% to 50%, which solution can then be passed into column 1 to produce the paraformaldehyde as above described. In this manner, the sole source of the formaldehyde in the production of the paraformaldehyde will be that which is contained in the methanol conversion gases. The only other material needed in the process will be water.

As briefly mentioned above, when operating the entire system, as illustrated, including the absorption of nearly all of the formaldehyde from the methanol conversion gases by finally passing water into countercurrent contact with the gases, the gases will be cooled to about 20° C. and methanol will be removed from the system at a slower rate than enters the system in the gases. Since the fractionating column 1 is operating at a comparatively high temperature, 300° C. to 75° C., the methanol will be driven off with the gases passing from the column to the absorption towers. The methanol will thus accumulate in the system to the point where it will interfere with its removal in column 1 and, therefore, interfere with the production of the paraformaldehyde. Means must, therefore, be provided for the removal of methanol from the system to prevent undue concentration therein. If sufficient water is passed into the system to remove the formaldehyde from the gases, and if the water and gases are cooled to insure complete absorption of the formaldehyde, the methanol conversion gases will not be sufficient to remove all of the water from the system and, therefore, the system will not concentrate the aqueous solutions of formaldehyde sufficiently to produce paraformaldehyde. Means must, therefore, also be provided to remove excess water from the system.

Both methanol and excess water may be removed by withdrawing a dilute aqueous solution of formaldehyde (5% to 15%) from the system. In order to conserve the formaldehyde and methanol in such dilute solution being withdrawn, it is most economical to concentrate the same, and, if desired, also separating the methanol and formaldehyde for the production of by-product, aqueous formaldehyde and methanol. This can be readily accomplished in several ways. As illustrated, the dilute formaldehyde solution withdrawn is passed through a pressure still, operating preferably at about 60 pounds per square inch pressure, to produce a 20% to 50% aqueous solution of formaldehyde which is separately salable. Instead of a pressure still, a vacuum still or vacuum evaporator can be used to concentrate the dilute formaldehyde solution.

The following example is given to illustrate, in detail, the production of paraformaldehyde from methanol conversion gases of a given concentration in apparatus of the type illustrated in the drawings.

Column 1 is made approximately 4.7 feet in diameter containing 14 plates designed with a relatively deep liquid seal of about 3 inches on each plate. Column 1 is made of stainless steel and is steam jacketed throughout its length. Steam at high pressure is continuously passed through the steam jacket.

The methanol conversion gases passed into the bottom of column 1 are obtained from the catalytic oxidation of methanol to formaldehyde and contain approximately

| Mol Per Cent | Constituent |
|---|---|
| 4.0 | $CH_2O$ |
| 5.0 | $H_2O$ |
| 0.3 | $CH_3OH$ |
| 75.0 | $N_2$ |
| 15.0 | $O_2$ |
| 0.7 | $CO_2$ |

The methanol conversion gases having a temperature of about 250° C. are passed into the bottom of column 1 at the rate of 261,000 pounds per day, or 10,875 pounds per hour. In passing through column 1, the gases are cooled to about 75° C. They are exhausted from column 1 and passed in turn through absorption towers 12, 13, and 14, and they are exhausted to the atmosphere, from tower 14. The finally exhausted gas will contain less than 1% by weight of the formaldehyde in the original gases and will have a temperature of 20° C. or less as a result of contact with tap water flowing into the top of tower 14. The gases are preferably drawn through the entire system by means of an exhaust fan which will create a pressure varying from atmospheric at the gas inlet in column 1 to between about 650–500 mm. Hg at the top of tower 14. The water is passed into the top of tower 14 at the rate of about 8,000 pounds per day.

The water, as it flows in turn through absorption towers 12, 13, and 14, countercurrently to the gases, gradually absorbs formaldehyde until it forms, at the bottom of tower 12, an aqueous solution of formaldehyde containing about 52% formaldehyde, by weight. Near the bottom of tower 14, the formaldehyde concentration will be about 9%. At this point, the solution is withdrawn at the rate of about 13,600 pounds per day and is passed into pressure still 22 where it is distilled at a pressure of about 60 pounds per square inch and 150° C. with reflux to produce an aqueous solution of formaldehyde containing about 50% formaldehyde and 13% methanol.

The solution of formaldehyde passing into column 1 is concentrated to liquid molten paraformaldehyde containing about 95.1% formaldehyde at the rate of about 11,500 pounds per day. The molten paraformaldehyde is flowed onto evaporating drum 9 from which solid paraformaldehyde is scraped by scraper 10 and collected in receiver 11.

Throughout the specification and claims, any reference to parts, proportions and percentages, refers to parts, proportions, and percentages by weight unless otherwise specified.

Since it is obvious that many changes and modifications can be made in the above-described details without departing from the nature and spirit of the invention, it is to be understood that the invention is not to be limited to the abovesaid details except as set forth in the appended claims.

I claim:

1. The process for the production of paraformaldehyde which comprises passing methanol conversion gases having an initial temperature between 200° C. and 300° C. in succession through a series of progressively less concentrated fractions of aqueous solutions of formaldehyde in a plate column, said aqueous solutions of formaldehyde flowing from plate to plate in said column in a direction opposite to the flow of said gases whereby the fractions become progressively more concentrated in formaldehyde, said fractions being sufficient in number to concentrate the formaldehyde to liquid paraformaldehyde.

2. The process for the production of paraformaldehyde which comprises passing methanol conversion gases having an initial temperature between 200° C. and 300° C. into one end of a connected system and in countercurrent flow through a series of progressively less concentrated fractions of aqueous solutions of formaldehyde, passing water into the opposite end of said system whereby to progressively concentrate the formaldehyde solutions flowing toward one end of the system until they are concentrated to liquid paraformaldehyde and progressively remove the formaldehyde from the gases flowing toward the other end of said system and simultaneously removing a sufficient portion of the aqueous solution of formaldehyde, after it has reached a concentration between 5% and 15% formaldehyde, to remove methanol and water in excess of that which will be removed from said system by said gas flow.

3. The process of claim 2 in which sufficient water is passed into said system to remove at least 98% of the formaldehyde content of said gases.

4. The process of claim 2 in which the gases are drawn through said system by creating a slightly subatmospheric pressure not less than about 500 mm. Hg in said system at the exit end for said gases.

ROBERT L. CRAVEN.

REFERENCES CITED

The following references are of record in the file of this patent:

UNITED STATES PATENTS

| Number | Name | Date |
|---|---|---|
| 1,677,730 | Sator | July 17, 1928 |
| 2,092,422 | Naujoks | Sept. 7, 1937 |
| 2,153,526 | Walker | Apr. 4, 1939 |

FOREIGN PATENTS

| Number | Country | Date |
|---|---|---|
| 577,573 | Great Britain | 1946 |